Oct. 30, 1962 H. L. JOHNSON 3,060,771
BLOCK TYPE TOOL WITH THROW-AWAY INSERTS
Filed April 30, 1959 2 Sheets-Sheet 1
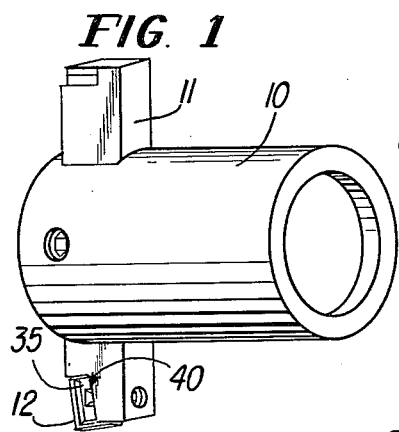
FIG. 1
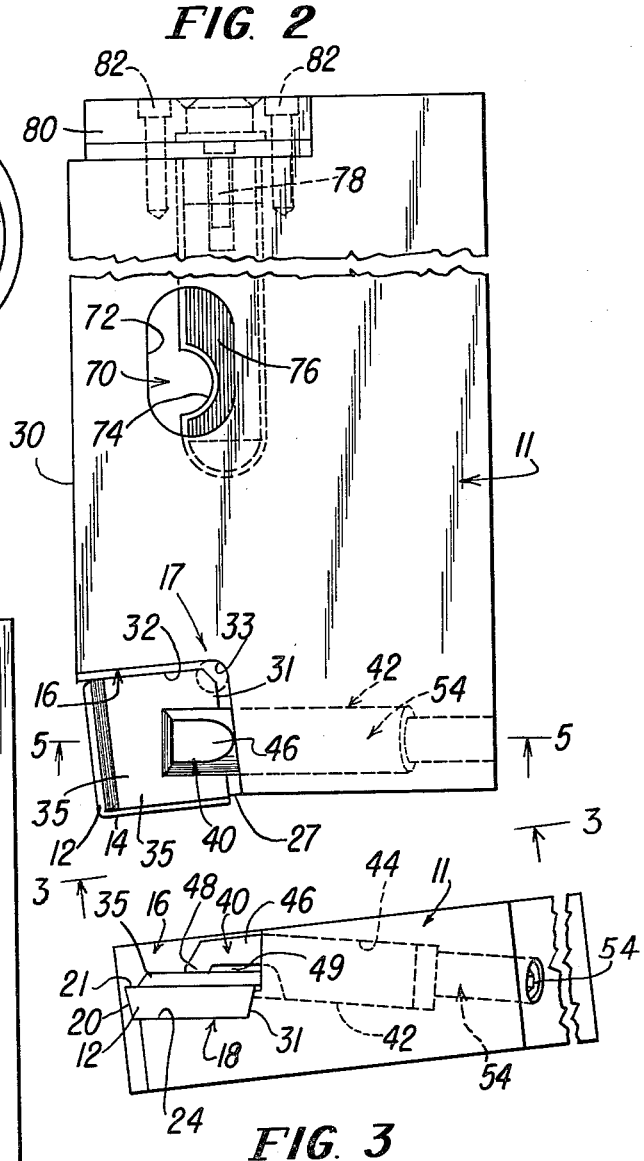
FIG. 2
FIG. 3
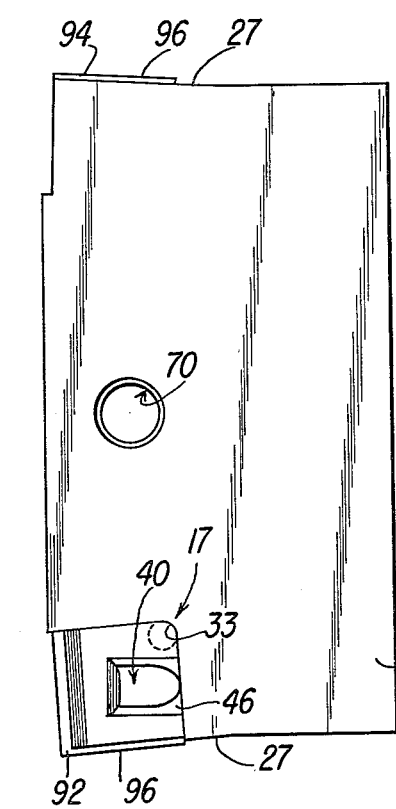
FIG. 8
INVENTOR.
Harold L. Johnson
BY Wolfe, Hubbard,
Voit & Osann
Attys.

Oct. 30, 1962 H. L. JOHNSON 3,060,771
BLOCK TYPE TOOL WITH THROW-AWAY INSERTS
Filed April 30, 1959 2 Sheets-Sheet 2
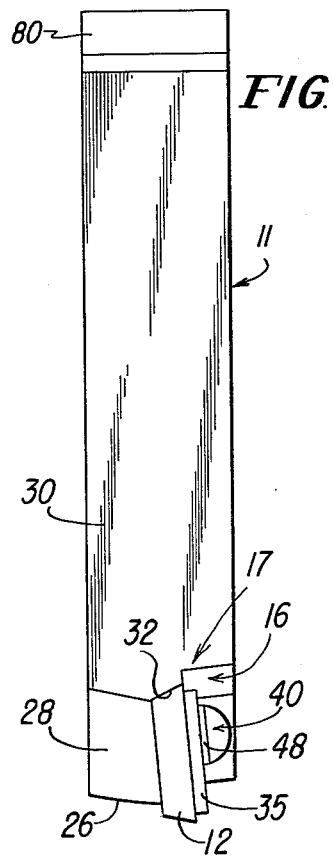
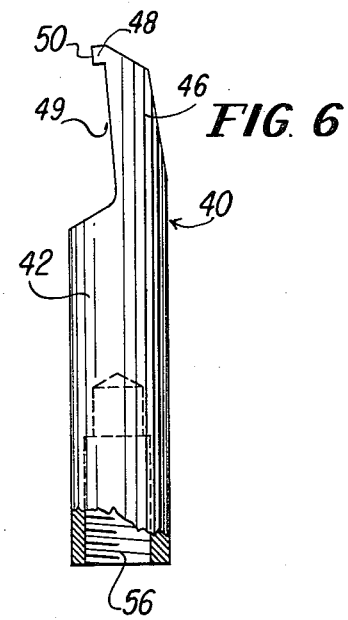
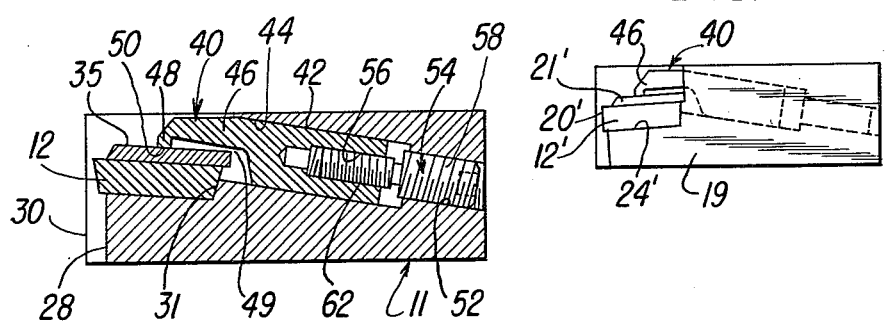
INVENTOR.
Harold L. Johnson
BY Wolfe, Hubbard,
Voit & Osann Attys.

3,060,771
BLOCK TYPE TOOL WITH THROW-
AWAY INSERTS
Harold L. Johnson, Fond du Lac, Wis., assignor to Giddings & Lewis Machine Tool Company, Fond du Lac, Wis., a corporation of Wisconsin
Filed Apr. 30, 1959, Ser. No. 810,071
1 Claim. (Cl. 77—58)

This invention relates to cutting tools and more particularly to an improved holder for carbide tips of the throw-away type.

It is a general object of the invention to provide a single point cutting tool incorporating throw-away carbide inserts.

More specifically, it is an object to provide a block type tool with throw-away indexable carbide inserts.

It is a further more specific object to provide a tool holder in the form of a block type tool having a recess at one end shaped to hold a throw-away carbide insert and a mechanism to clamp the insert in place.

A further object is to provide a block type tool so constructed as to offer a rigid backing for a throw-away inserts, particularly in the region backing the cutting edge. A related object is to provide a block type tool having a clamp so located within the block as not to impair the strength of the block nor the rigid backing for a throw-away insert held by means of the clamp.

Another object is to provide a clamping mechanism which has a positive clamping action tending to force the insert into full bearing contact with the locating surfaces on the block.

Another object is to provide a clamping mechanism which has a positive release action.

Other objects and advantages will become apparent as the following description proceeds, taken in connection with the accompanying drawings in which:

FIGURE 1 is a perspective view of a boring bar with a single cutter boring block;

FIG. 2 is a plan view of the single cutter block shown in FIGURE 1;

FIG. 3 is a front elevational view of the single cutter block taken in the inclined plane of lines 3—3 of FIG. 2;

FIG. 4 is a side elevational view of the single cutter block shown in FIG. 2;

FIG. 5 is a sectional view taken in the plane of lines 5—5 of FIG. 2;

FIG. 6 is a detail view of the clamp member;

FIG. 7 is a front elevational view of a single cutter block having a cutting tip positioned at a negative rake angle; and FIG. 8 is a plan view of a double cutter block with two throw-away inserts.

While the invention is susceptible of various modifications and alternative constructions, an illustrative embodiment has been shown in the drawings and will be described below in considerable detail. It should be understood, however, that there is no intention to limit the invention to the specific form disclosed, but on the contrary, the invention is to cover all modifications, alternative constructions and equivalents falling within the spirit and scope of the invention as expressed in the appended claims.

Referring to FIGURE 1, there is depicted a boring bar 10 adapted to be mounted in the spindle of a machine tool. The boring bar 10 is of conventional type having a radial slot for receiving a block 11 carrying, in the present instance, a single indexable throw-away tip or insert 12 which may be made of a hard metal alloy such as tungsten carbide. The block 11 carries the insert or tip 12 so that the latter presents a single cutting edge 14 for boring. As depicted, the throw-away tip or insert is of the square type which presents four different cutting edges available successively by appropriate indexing of the tip, and when all four cutting edges become dull the tip may be discarded and replaced with a new one. It will appear, however, that other tip shapes, such as triangle or hexagon, may be used if desired.

FIGS. 2–5 illustrate in detail the block 11 which is of elongated, generally rectangular shape with a recess 16 in one face of the block at one corner portion 17. The bottom of the recess 16 is formed with a pocket 18 which is shaped and dimensioned to hold the square insert. In a case where a triangular or other polygonal shaped insert is to be used on the block type tool, then the pocket 18 may be shaped and dimensioned accordingly. By means of the locating surfaces of the pocket 18, the tip or insert 12 is positioned without the assistance of adjusting or stop screws to present the single cutting edge 14 properly for boring with the block 11 locked centrally of the boring bar 10.

With the block 11 shown in FIGS. 2–5, the square throw-away tip 12 is held for positive rake cutting. In FIG. 7 a block tool 19 is depicted of the same type shown in FIGS. 2–5, with a square indexable throw-away tip 12' held for negative rake cutting. In the latter case, the tip 12' is reversible to provide eight cutting edges by appropriate indexing, while in the case of the positive rake block tool shown in FIGS. 2–5, as indicated above, only four different cutting edges are available. The difference between the tips 12, 12' should be readily apparent. The tip 12 used for positive rake cutting has narrow edges 20 inclined at an acute angle with relation to the face 21 of the tip, so that when the tip is held as shown in FIGS. 2–5, clearance is provided behind the cutting edge 14. On the other hand, with the tip 12' held as shown in FIG. 7, with the face 21' inclined forwardly for negative rake cutting, the narrow edges 20' may be fashioned perpendicular to one another and to the parallel faces 21 of the tip, allowing the tip to be flipped over and used.

Turning now to the positive rake block tool shown in FIGS. 2–5, the pocket surface 24, which is accurately ground, serves as one locating surface for the tip 12. Since the faces 21 of the tool tip 12 are parallel, the angular relation of this bottom surface 24 of the pocket determines the rake angle between the face 21 of the tool tip 12 and the machined surface left by the cutting edge 14, when the tool tip 12 carried by the block 11 and the boring bar 10 is operated in cutting position. In the present instance, this bottom surface is inclined downwardly both transversely and inwardly of the block (FIGS. 3, 5) so that the carbide tool tip 12 is held with the face 21 forming a positive rake angle. Referring to FIG. 7, the bottom surface 24' is inclined in the opposite directions, i.e., upwardly in both the transverse and inward directions so that a tool tip carried thereon is positioned to form a negative rake angle.

The outer end 26 of the block 11 is curved, as shown viewed from the side in FIG. 4, to provide clearance between the end of the block 11 and the machined surface of a hole bored by the block tool when mounted on and rotated by a spindle operated boring bar. The block corner 17 having the pocket 18 has an extension formed by one side 27 of the square corner portion 17 carrying the insert 12 extending outwardly at an acute angle of about 6° from the end of the block, and the other side 28 of this corner portion 17 located perpendicular thereto, leaving an angle of about 6° between the side edge 28 and the long side 30 of the block.

To position the carbide insert or tip 12 so that the cutting edge 14 is located with suitable lead and end cutting edge angles, the two straight interior sides 31, 32 of the pocket which serve as further locating surfaces for the insert 12 are machined generally perpendicular to the outer sides of the corner portion 17 of the block leaving clearance with the walls of the recess 16 and angularly disposed to be flat against the narrow sides of the insert. The side locating surfaces are thus disposed generally perpendicular to the bottom surface of the pocket. A transverse bore 33 at the intersection of the locating surfaces 31, 32 and extending to a depth just below the bottom surface 24 facilitates machining of the pocket by allowing a milling cutter to be used to cut the side surfaces. Clamped on the block the insert 12 is in full abutting relation against both interior side edges 31, 32 of the pocket as well as in full bearing contact against the bottom surface 24 of the pocket. Due to the shape of the corner portion 17 of the block, the insert 12 overhangs a uniform distance outwardly beyond the sides of the corner portion to present the cutting edge 14 to the workpiece. As a result of this arrangement the corner portion 17 provides better means for backing the cutting edge 14.

The pocket 18 is adapted to receive the insert or tip 12 together with a chip breaker plate 35 which in this case is interposed between the upper face 21 of the tip 12 and a clamp 40 located entirely between the parallel outer faces of the block 11.

In keeping with the invention the clamp 40 operates to draw the tool tip into the pocket tending to hold the tip tightly against the bottom surface and locating sides of the pocket. For this purpose the clamp 40 includes a cylindrical shank 42 having a sliding fit in a drilled hole 44 in the block 11. This hole 44 opens into the insert pocket 18 and is inclined with respect to the face of the block, while lying generally parallel to the end of the block. The clamp member 40 is shown in detail in FIG. 6. It has an inclined tip 46 carried by the cylindrical shank 42 with a flattened end portion 48 adapted to overlie the chip breaker plate and tool tip 12 in the pocket. The under face of the tip is undercut to provide a slight clearance 49 for the chip breaker plate and leaving a narrow under lip which is flat and defines the clamping face 50 bearing against the chip breaker plate. The clearance 49 on the under side of the tip of the clamp member and extension of the tip from the drilled hole allow some slight flexing of the tip of the clamp member as it is drawn into engagement with the insert and chip breaker assembly. During operation of the block tool for cutting purposes, however, the forces acting on the tip 12 are transmitted directly to the corner portion 17 of the block carrying the tool tip and the wedging action of the clamp member 40 holds the tip 12 in firm contact with the bottom surface 24 of the pocket. The angular disposition of the drilled hole in the block 11, and the effective angle of the flat clamping face 50 of the clamp member 40 are such that the clamp acts against the chip breaker plate and insert to draw them tightly into the pocket. In both block tools for positive rake and negative rate cutting (FIGS. 2, 7) the axis of the drilled hole 44 lies generally parallel to the end of the block and is inclined downwardly from the face of the block at an angle greater than the inclination of the bottom surface 24 of the pocket. One end of the drilled hole 44 opens into the pocket 18 while the other end has a threaded section 52 of reduced diameter.

To move the clamp member 40 in the drilled hole 44, a clamp screw 54 is provided threadedly received in a hole 56 in the end of the clamp member and in the threaded section 52 of the drilled hole 44 in the block. The outer end 58 of the clamp screw has a left-hand thread as has the section 52 of the drilled hole, while the inner end 62 of the clamp screw 54 has a right-hand thread engaged in threads in the hole 56 in the clamp member. Rotation of the screw 54 as by an Allen wrench in a socket in the head of the screw, causes the clamp member 40 to be adjusted axially of the drilled hole in the block 11.

The clamp 40, when drawn tightly against the chip breaker plate by rotation of the clamp screw 54, produces a downward force against the latter near its midpoint. As above noted, the angular disposition of the axis of movement of the clamp member 40 downwardly and away from the bottom surface 24 of the pocket produces a wedging action by the bearing face of the clamp member on the chip breaker plate and insert to hold the latter in abutment with the bottom surface and the locating side surfaces of the pocket in the block 11. While this wedging action also tends, as the clamp is tightened, to draw the chip breaker and insert in abutment with the locating side surface 31 in the pocket which lies parallel to the side of the block, the force acting on the insert when held in cutting position against a workpiece tending to move the insert into the pocket, insures that the insert shall be forced to and maintained in abutment with the other locating side surface 32. The under cut on the under face of the clamp leaving a narrow lip face, enables the clamping force to be concentrated on the surface of the chip breaker without leaving excessive clearance which might permit chips to enter the space 49 under the clamp member 40.

To release the insert 12 so that the latter may be indexed or replaced, the clamp screw 54 is rotated in the reverse direction, overcoming the friction force due to the wedging action which holds the clamping member 40 against movement. Reverse rotation of the screw 54 overcomes the force holding the clamp member 40 obtaining a positive ejection force on the clamp. If the carbide insert 12 should not become free readily when the clamp 40 is loosened, continued turning of the clamp screw 54 moves the clamp member until the shoulder at the start of the under cut engages the chip breaker and tool tip 12 to positively force the insert from the pocket.

The block type tools shown in FIGS. 2–5 and 7, are forms of a single cutter block tooling. As above indicated, the block 11 are adapted to be received in a radial slot in the boring bar 10. To secure the blocks in the bar, the blocks are provided with a transverse tapered bore 70 which is adapted to line up with a transverse bore in the boring bar so that a pin may be used to lock the block in the bar. The clamp 40 is located entirely within the block 11 so as not to increase the overall dimensions thereof nor interfere with the block being inserted in the radial slot within the bar. In the present case the position of the block is adjustable radially of the boring bar so as to provide adjustment of the radius of the cut. For this purpose the position of the tapered bore 70 through the block may be varied. The tapered bore is defined between the left wall 72 of an elongated opening extending through the block, and a cut-out 74 in the edge of a keeper 76 slidably supported in the block 11. The keeper 76 is adjustable longitudinally of an under cut groove in the block 11 by means of an adjustment screw 78 held by a keeper plate 80 anchored by machine screws 82 to the block 11.

While the invention has been described in connection with a single cutter block having a throw-away carbide tool tip, in carrying out the invention a two cutter block type tool may be provided to carry throw-away carbide tool tips. Such an application of the invention is shown in FIG. 8. The two cutter type block 90 as there depicted is used to rough and semi-finish bores of a specified size. The separate cutters 92, 94 provide means for carrying out the roughing and semi-finishing operations. When either insert 92, 94 becomes dull, it may be indexed to present a new cutting edge 96, or, if all edges have become dulled, it may be replaced with a new insert of identical size. It will be readily appreciated that the accuracy of the bore size is dependent largely upon the precision of the mounting of the inserts 92, 94 on the block 90, and the accuracy in the dimensions of the inserts themselves. While the two cutter block 90 shown in FIG. 8 happens to provide for positive rake cutting, it will be noted that, as in the case of the single cutter block 11 shown in FIGS. 2–5, either positive or negative rake cutting may be obtained by locating the bottom surface at a suitable angle. Since the clamping mechanism for the two cutter block type tool will be the same as that previously described for clamping an insert in the single cutter tool of FIGS. 2–5 and 7, a detailed description will not be given. It should be noted, however, that similar advantages are offered as with the previously described block tool. The location of the clamping mechanism 40 in a region spaced from the corner portion 17 of the block 11 which backs the tool tip, so as not to impair the rigidity of the backing or the strength of the block, is a major feature and is found in both the single and double cutter blocks. The angular relation of the clamp so as to provide both positive clamping action on the insert and positive release of the clamp is also found in both types of block tools shown. The provision of the clamp 40 entirely within the block so that the overall dimensions of the block 11 are unchanged, enable the block 11 to be used with a standard boring bar.

A further feature offered by all forms of the block tools shown is the simplicity of design. It has been found that it is possible to heat-treat the block after machining, while in many cases with blocks known in the past heat-treatment for hardness following machining was impractical due to the configuration of the block.

It will further be readily noted that the block tools may be made in a wide range of block sizes and styles, as is well known to those skilled in the art.

I claim as my invention:

A holder for a polygonal throw-away tool tip comprising, in combination, an elongated block for carrying the tool tip, said block having an extension at one corner and a recess at said corner extending over said extension, said recess including a pocket defined by a flat bottom tool tip supporting surface and two side tool tip locating surfaces, said pocket thus flatly engaging three sides of a tool tip placed therein with the tool tip overhanging said block corner and partially supported by said extension to present a cutting edge to a workpiece, said block having a bore open to said recess and extending through said block at a slight downwardly inclined angle relative to said pocket supporting surface, a clamp member slidably fitted in said bore, said clamp member having an overhanging front end portion extending forwardly from an underlying shoulder down over only the center portion of said pocket so as to sandwich a tool tip therein, said clamp member being completely received in said bore and said recess so as not to project beyond the sides of said block, and a clamp screw threaded in said bore and engaging said clamp member so that rotation of the screw shifts said clamp member end portion to and from said pocket bottom supporting surface and one of said side locating surfaces, said shoulder adapted to strike and dislodge a tool tip in said pocket when the member is shifted from said surfaces, said screw being recessed in said bore and having a head portion accessible from the bore end opposite said pocket.

References Cited in the file of this patent
UNITED STATES PATENTS

| | | |
|---|---|---|
| 1,855,511 | Edgar | Apr. 26, 1932 |
| 2,076,663 | Miller | Apr. 13, 1937 |
| 2,203,104 | Reaney | June 4, 1940 |
| 2,382,911 | Pringle | Aug. 14, 1945 |
| 2,453,464 | Sheridan | Nov. 9, 1948 |
| 2,644,224 | Chilcott | July 7, 1953 |
| 2,645,844 | Longe | July 21, 1953 |
| 2,664,617 | Kralowetz | Jan. 5, 1954 |
| 2,799,079 | Brigner | July 16, 1957 |
| 2,848,789 | Friedline | Aug. 26, 1958 |
| 2,878,695 | Busch | Mar. 24, 1959 |